(12) United States Patent
Qiang et al.

(10) Patent No.: US 9,430,399 B2
(45) Date of Patent: Aug. 30, 2016

(54) MULTI-CORE ONLINE PATCHING METHOD AND APPARATUS

(71) Applicant: Huawei Technologies Co., Ltd., Shenzhen (CN)

(72) Inventors: Hongfei Qiang, Hangzhou (CN); Zhen Lei, Hangzhou (CN); Fangbing Yao, Hangzhou (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 161 days.

(21) Appl. No.: 13/847,344

(22) Filed: Mar. 19, 2013

(65) Prior Publication Data

US 2013/0219147 A1    Aug. 22, 2013

Related U.S. Application Data

(63) Continuation of application No. PCT/CN2011/074094, filed on May 16, 2011.

(30) Foreign Application Priority Data

Oct. 13, 2010   (CN) .......................... 2010 1 0505514

(51) Int. Cl.
*A63F 9/24* (2006.01)
*G06F 12/10* (2016.01)
(Continued)

(52) U.S. Cl.
CPC ............. *G06F 12/1009* (2013.01); *G06F 8/67* (2013.01); *G06F 11/0724* (2013.01); *G06F 11/0793* (2013.01); *G06F 12/0638* (2013.01); *G06F 12/0292* (2013.01)

(58) Field of Classification Search
CPC .... G06F 12/109; G06F 9/44; G06F 12/0292; G06F 12/1009
USPC .......................................................... 717/170
See application file for complete search history.

(56) References Cited

U.S. PATENT DOCUMENTS 5,699,275 A * 12/1997 Beasley et al. ............... 709/221
7,984,434 B1 * 7/2011 Gathoo ......................... 717/170
(Continued)

FOREIGN PATENT DOCUMENTS

CN         1567195 A      1/2005
CN       101106773 A      1/2008
(Continued)

OTHER PUBLICATIONS

Foreign Communication From a Counterpart Application, Chinese Application No. 201010505514.4, Chinese Office Action dated Jun. 24, 2013, 7 pages.
(Continued)

*Primary Examiner* — Ryan Bertram
*Assistant Examiner* — Trang Ta
(74) *Attorney, Agent, or Firm* — Conley Rose, P.C.; Grant Rodolph; Nicholas K. Beaulieu

(57) ABSTRACT

A multi-core online patching method and an apparatus for mapping patch data to a patch area of a shared memory are disclosed. A method of the embodiment of the present invention includes: separating shared global variables and private global variables defined in a patch; mapping the shared global variables to a shared data segment in a patch area by using a mapping mode of a direct memory address, and mapping the private global variables to private data segments in the patch area by using a mapping mode of a variable address specified by a user. The embodiments of the present invention may be used in a multi-core DSP system of telecom-grade software.

20 Claims, 6 Drawing Sheets

(51) Int. Cl.
*G06F 11/07* (2006.01)
*G06F 9/445* (2006.01)
*G06F 12/06* (2006.01)
*G06F 12/02* (2006.01)

(56) References Cited

U.S. PATENT DOCUMENTS

| | | | |
|---|---|---|---|
| 2004/0098715 A1* | 5/2004 | Aghera et al. | 717/173 |
| 2004/0107416 A1* | 6/2004 | Buban et al. | 717/170 |
| 2005/0257208 A1* | 11/2005 | Blumfield et al. | 717/168 |
| 2006/0101450 A1* | 5/2006 | Datta et al. | 717/168 |
| 2007/0113225 A1* | 5/2007 | Felts | 717/172 |
| 2008/0256305 A1 | 10/2008 | Kwon et al. | |
| 2009/0064158 A1 | 3/2009 | Carter | |
| 2009/0187725 A1 | 7/2009 | Mencias et al. | |
| 2010/0023728 A1 | 1/2010 | El-Mahdy et al. | |
| 2010/0094825 A1* | 4/2010 | Kelso et al. | 707/705 |
| 2012/0066484 A1 | 3/2012 | Yin et al. | |

FOREIGN PATENT DOCUMENTS

| | | |
|---|---|---|
| CN | 101178672 A | 5/2008 |
| CN | 101286144 A | 10/2008 |
| CN | 101425911 A | 5/2009 |
| CN | 101561764 A | 10/2009 |
| CN | 101582148 A | 11/2009 |
| CN | 101661397 A | 3/2010 |
| CN | 101794230 A | 8/2010 |
| GB | 2444148 A | 5/2008 |
| WO | 9829806 A | 7/1998 |

OTHER PUBLICATIONS

Foreign Communication From a Counterpart Application, Chinese Application No. 201010505514.4, Partial English Translation Chinese Office Action dated Jun. 24, 2013, 13 pages.

Foreign Communication From a Counterpart Application, PCT Application PCT/CN2011/074094, English Translation of the Written Opinion dated Aug. 11, 2011, 4 pages.

Foreign Communication From a Counterpart Application, Chinese Application 201010505514.4, Chinese Office Action dated Dec. 20, 2012, 15 pages.

Foreign Communication From a Counterpart Application, Chinese Application 201010505514.4, Partial Translation of Chinese Office Action dated Dec. 20, 2012, 21 pages.

Foreign Communication From a Counterpart Application, European Application No. 11777188.1 Extended European Search Report dated Aug. 21, 2013, 8 pages.

Wagner, I., et al., "CASPAR: Hardware Patching for Multi-core Processors," Design, Automation&Test in Europe Conference&Exhibition, XP031477857, Apr. 20, 2009, 6 pages.

Foreign Communication From a Counterpart Application, European Application No. 11777188.1, European Office fiction dated Dec. 11, 2015, 8 pages.

Communication from a foreign counterpart application, International Application No. PCT/CN2011/074094, English Translation, International Search Report dated Aug. 11, 2011, 4 pages.

\* cited by examiner

MULTI-CORE ONLINE PATCHING METHOD AND APPARATUS

CROSS-REFERENCE TO RELATED APPLICATIONS

This application is a continuation of International Application No. PCT/CN2011/074094, filed on May 16, 2011, which claims priority to Chinese Patent Application No. 201010505514.4, filed on Oct. 13, 2010, both of which are hereby incorporated by reference in their entireties.

STATEMENT REGARDING FEDERALLY SPONSORED RESEARCH OR DEVELOPMENT

Not applicable.

REFERENCE TO A MICROFICHE APPENDIX

Not applicable.

TECHNICAL FIELD

The present invention belongs to the field of computer technologies, and in particular, to a multi-core online patching method and apparatus.

BACKGROUND

An online patch refers to a patch taking effect in a running program without restarting the program. For a multi-core processor, a current multi-core central processing unit (CPU) with a hardware memory management unit (MMU) supports an online patching function. In an environment of a multi-core CPU, operations such as loading and activation of the online patch are implemented by a master core.

As shown in FIG. 1, in the patch loading operation of the multi-core CPU, the master core obtains a patch, puts the patch to a cache, parses the patch, extracts code segments and data segments of the patch, and loads the patch according to a logic address. The MMU of the hardware implements the mapping from the logic address to a physical address, and maps core private data to each private data segment in a patch area of a shared memory.

In the process of implementing the present invention, the inventors find that, under an MMU condition, because each core in the multi-core CPU accesses the same logic address, and the logic address is mapped to different physical addresses in the patch area, shared global variables of the multi-core CPU cannot be mapped.

SUMMARY

Embodiments of the present invention provide a multi-core online patching method and apparatus, which can map all patch data to a patch area of a shared memory.

Embodiments of the present invention adopt the following technical solutions.

A multi-core online patching method includes: separating shared global variables and private global variables in a patch; and mapping the shared global variables to a shared data segment in a patch area by using a mapping mode of a direct memory address, and mapping the private global variables to private data segments in the patch area by using a mapping mode of a variable address specified by a user.

A multi-core online patching apparatus includes: a variable separation unit configured to separate shared global variables and private global variables in a patch; and a mapping unit configured to map the shared global variables to a shared data segment in a patch area by using a mapping mode of a direct memory address, and map the private global variables to private data segments in the patch area by using a mapping mode of a variable address specified by a user.

It can be known from the above technical solutions of the embodiments of the present invention that, by separating the shared global variables and the private global variables in the patch, mapping the shared global variables to the shared data segment in the patch area by using a mapping mode of a direct memory address, and mapping the private global variables to the private data segments in the patch area by using a mapping mode of a variable address specified by a user, the shared global variables and the private global variables may be mapped at the same time, and mapping all patch data to the patch area of a shared memory is implemented.

BRIEF DESCRIPTION OF THE DRAWINGS

To make the technical solutions under the present invention clearer, the following describes the accompanying drawings used in the description of the embodiments of the present invention.

DETAILED DESCRIPTION

Figure 1:
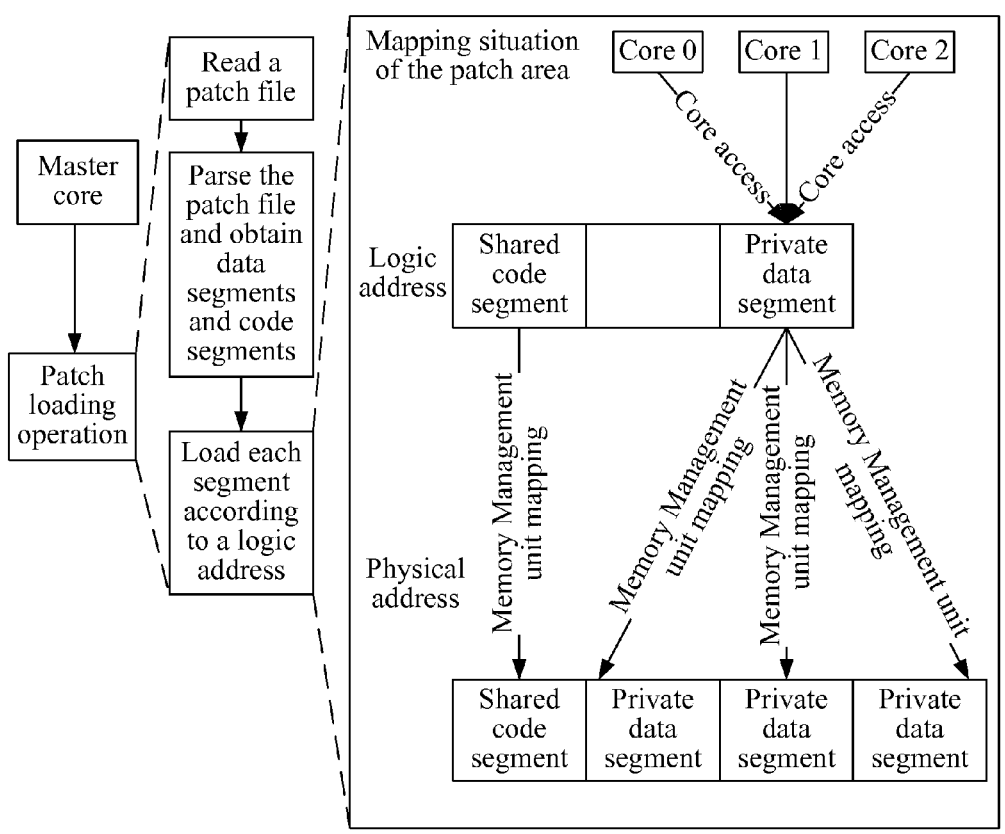
FIG. 1 is a schematic diagram of an operation process of patch loading of a multi-core CPU in the prior art.
Figure 2:
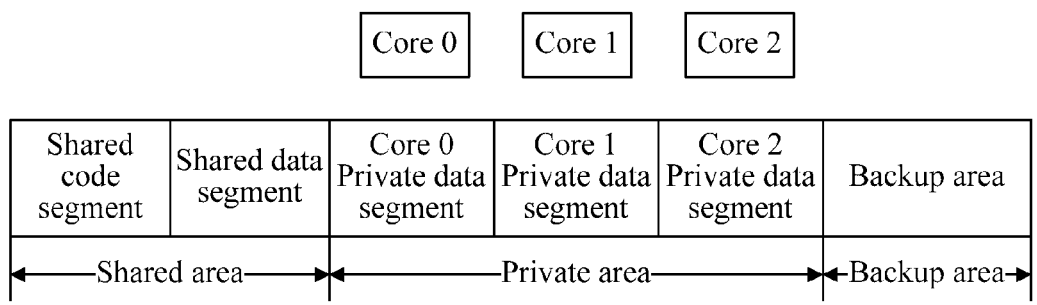
FIG. 2 is a schematic diagram of physical address dividing of a patch area according to the present invention.

In order to clearly illustrate how to map all patch data to a patch area of a shared memory, referring to FIG. 2, dividing of a physical address of the patch area is illustrated first. In the present invention, the physical address of the patch area is divided into three successive parts: a shared area, a private area, and a backup area.

The shared area includes shared code segments and a shared data segment, where the shared code segments are used to store shared codes of patches and read-only data segments in patch codes, and the shared data segment is used to store the shared global variables defined in the patches. The shared area of the patches is mapped by way of a direct memory address, that is, when a core reads data, the core obtains the data directly from the memory, not through a cache bus.

The private area is evenly divided into multiple private data segments according to the number of cores. Initial addresses of each private data segment are aligned according to the size of a Cache Line (the minimum unit of Cache), and each private data segment is used to store the private global variables defined in the patches. The patch private area is mapped by way of a variable address specified by a user, that is, the patch private area may be mapped by using a mapping mode of a cache bus access address or by using a mapping mode of a direct memory address.

The backup area is used to back up a function instruction of a core private memory and core private data, and used for self-restoring of a core initialized patch status.

The following describes the technical solutions of the present invention clearly and completely with reference to accompanying drawings.

Figure 3:
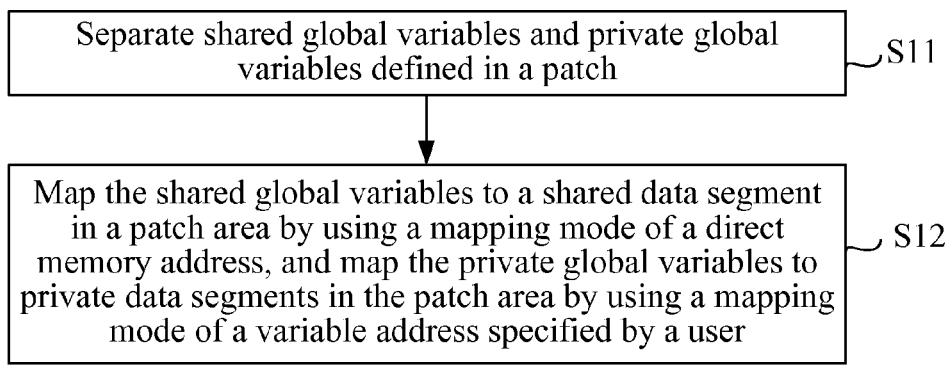
FIG. 3 is a flow chart of an embodiment of a multi-core online patching method provided by the present invention.

As shown in FIG. 3, an embodiment of a multi-core online patching method provided by the present invention includes:

S11: Separate shared global variables and private global variables defined in a patch.

In order to ensure that access of the private global variables in the patch are free from influence, the embodiment of the present invention adopts the following defining forms for the private global variables defined in the patch.

The private global variables in the patch are defined as structure variables, and a size of a structure is a size of a private data segment of each core in a patch area; after defining member variables of the structure variables is completed, the residual space is segmented by using magic numbers, where data before magic numbers is valid data. Therefore, when extracting data segments, a patch tool searches for the magic numbers, and extracts only the valid data as the core private data; when a patch file is written, the pragma programming manner in the prior art may be used to place the shared global variables and the private global variables in different data segments.

S12: Map the shared global variables to a shared data segment in a patch area by using a mapping mode of a direct memory address, and map the private global variables to private data segments in the patch area by using a mapping mode of a variable address specified by a user.

The mapping of the private global variables by using a mapping mode of a variable address specified by a user specifically may be: extracting the valid data of the private global variables, and according to the size of the defined structure, mapping the valid data to the private data segments of each core in the patch area by using a mapping mode of a direct memory address or by using a mapping mode of a cache bus access address.

When the patch tool parses the data segments, if the data segments are shared global variables, mapping is performed according to a direct memory address; if the data segments are private global variables, mapping is performed according to variable addresses specified by a user, and magic numbers are searched in the data segments, the valid data before the magic numbers is recorded in the patch file, and the size of the valid data is added to available initial address of the private data segments of each core as an initial address of available private data segments next time, for being used in patch making next time.

If a patch is made for the first time, information of a patch area is obtained from configuration files, or addresses of code segments and data segments in patch making this time are obtained from patch files. According to the used addresses of valid data that are accumulated, the initial address in patch making next time is located, and the multiplexing of patch data segment space is implemented.

It can be seen that, by separating the shared global variables and the private global variables defined in the patch, mapping the shared global variables to the shared data segments in the patch area by using a mapping mode of a direct memory address, and mapping the private global variables to the private data segments in the patch area by using a mapping mode of a variable address specified by a user, all the patch data may be mapped to the patch area of a shared memory; besides, because different mapping manners are adopted in different variable types, and thereby the consistency of cache maintained by software is implemented, and cache conflicts are avoided.

Furthermore, the multi-core online patch method provided by the embodiment of the present invention may further include: backing up a function instruction of a core private memory and core private data to a data backup area in the patch area.

Therefore, when a patch management end performs a patch loading operation, the core private data, apart from loading to the private data segments of each core of the corresponding patch area, further needs to be loaded to the data backup area in the patch area for one time, so that after a single core is reset, the private data can also be restored when the patch status is restored.

Figure 4:
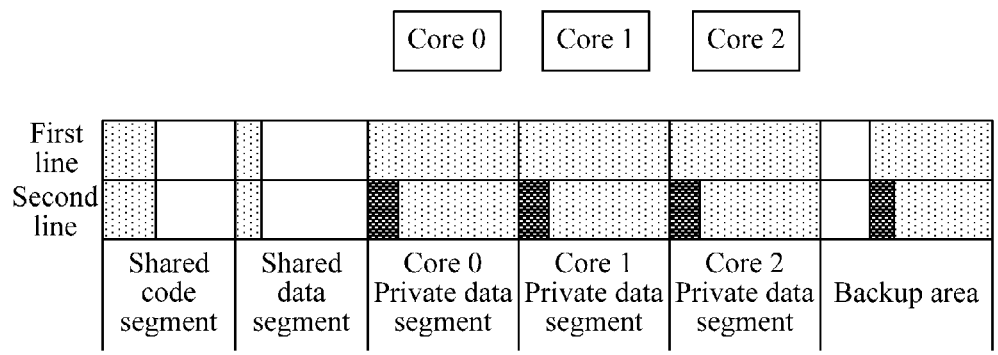
FIG. 4 is a contrast diagram of a use situation of an external display after a patch is loaded for several times in a patch area and an actual use situation according to the present invention.
Figure 5:
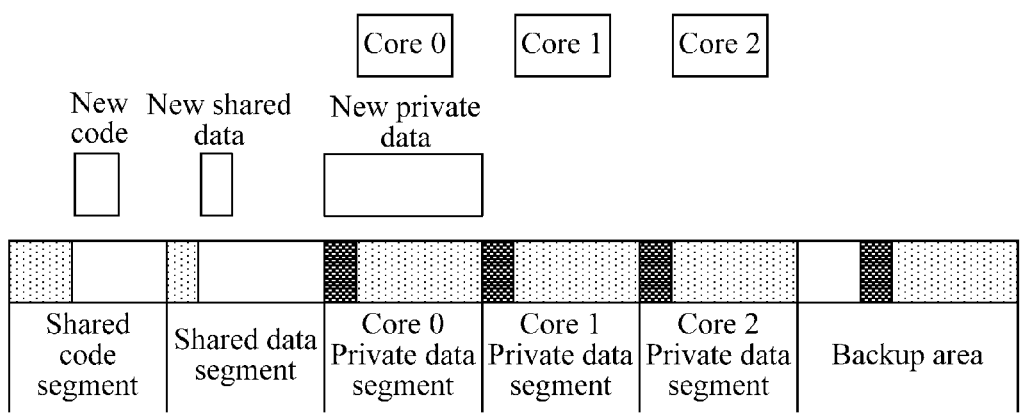
FIG. 5 is a schematic diagram of a use situation of a patch area before a new patch is loaded according to the present invention.
Figure 6:
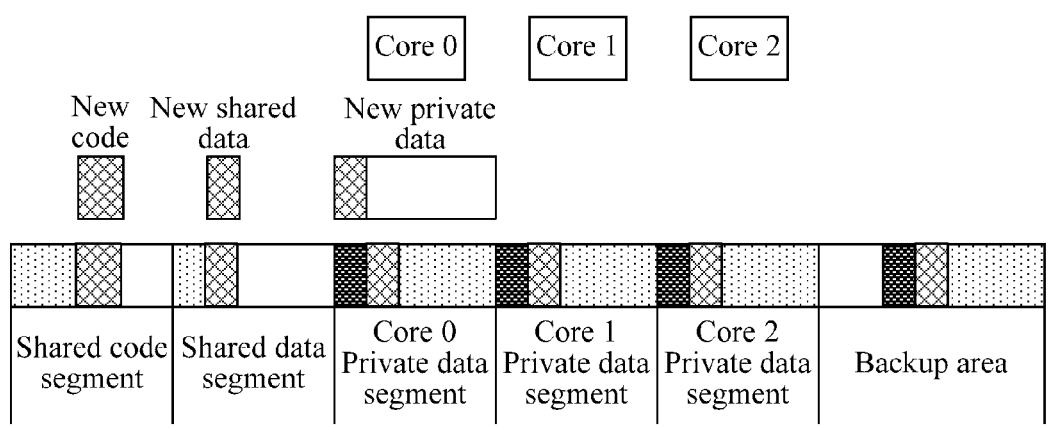
FIG. 6 is a schematic diagram of a use situation of the patch area after a new patch is loaded according to the present invention.

Referring to the mapping situation of the patch area in FIG. 4 to FIG. 6, the first line in FIG. 4 describes a use situation of an external display after a patch is loaded for several times in a patch area; the second line of FIG. 4 describes the actual use situation after a patch is loaded for several times in a patch area, where the part with darker gray is the valid data actually used by private data segments; FIG. 5 describes a new patch that needs to be loaded, the space displayed above each segment is the size defined in each segment of an actual patch file; and FIG. 6 is an actual use situation of the patch area after a new patch has been loaded.

It can be seen from FIG. 4 to FIG. 6, for the private global variables, when performing loading, the patch management end extracts only their valid data, and according to the defined size of the variables, loads the valid data to the private data segments and the data backup area of each core in the patch area. By defining the private global variables as structure variables, and using magic numbers, the defined size and the maintained size of the private global variables are separated from each other.

In an environment of a multi-core CPU, a cache is maintained by hardware, and because of the limitation of hardware memory characteristics, a master CPU core must be writable for all code segments and requires a master core to complete the operation process of a patch, and the master core must be fixed. When a certain core is abnormal, for example, is dead, none of the patching function operations can be completed, and all the CPUs need to be reset to implement the patching operation. For a multi-core digital signal processor (DSP) of telecom-grade software, the cache is maintained by software, each core has its own private memory. To implement that a certain DSP core can implement the patching function when the certain DSP core is abnormal, and after the abnormal core is reset, the certain DSP core can self-restore to the patch status. Therefore, with the multi-core online patch method provided by the embodiments of the present invention, the synchronous mask table needs to be processed as follows:

When the patch is initialized, a synchronous mask table with the same image is configured for all cores; when a certain core in the multiple cores is abnormal, if the abnormal core exists in the synchronous mask table, a synchronous mask flag of the abnormal core is removed from the synchronous mask table; after the abnormal core is reset, the patch status is restored according to the data backup area in the patch area, and the removed synchronous mask flag is re-added to the synchronous mask table after the patch status is restored on the abnormal core successfully. So when the patch is activated, the operation core of the multi-core DSP initiates a synchronization event to an online slave core according to the latest synchronous mask table.

The patch activation is a process that an online patch takes effect, and the basic principle of the online patch activation is to replace an instruction at the entrance of a primary function (a to-be-patched function) with a skip instruction, and skip a program invoking the primary function to a patch function in the patch area through the skip instruction to be executed, which relates to a core synchronous operation. In order to implement that a certain core can still implement the patching function in a case that the certain core is abnormal, when the patch is activated, the operation core may initiate the synchronization event to an online slave core according to the latest synchronous mask table.

Figure 7:
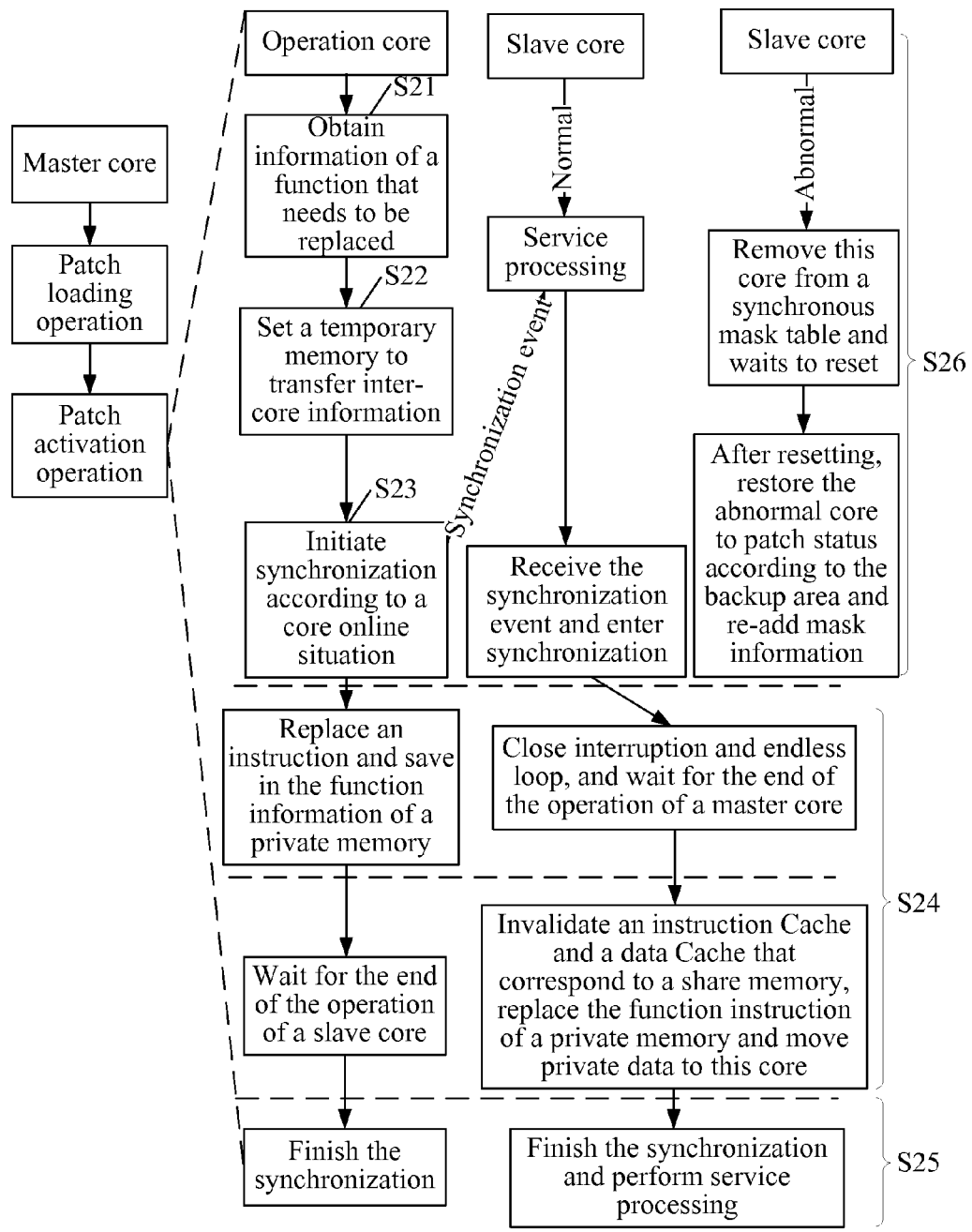
FIG. 7 is a schematic diagram of an operation process of patch activation provided by an embodiment of the present invention.

Referring to FIG. 7, the operation process of the patch activation according to an embodiment of the present invention is specifically as follows:

S21: An operation core obtains information of a function that needs to be replaced.

The operation core obtains patch function information according to the patch that needs to be activated, where the obtained information includes: a primary function address and an address of a patch function in the patch area.

S22: The operation core sets a temporary memory to transfer inter-core information.

The operation core applies for a segment of a temporary memory to deliver inter-core information, where the delivered information includes: information such as the number of functions needs to be invalid, the data segments corresponding to a function address and the function, and the number of the functions in the core private memory and the corresponding skip instruction.

S23: The operation core initiates synchronization according to a core online situation.

The operation core obtains core online situation according to the latest synchronous mask table, initiates the synchronization event to the corresponding slave core, and then enters a synchronous wait status. After receiving the synchronization event, the online slave core enters the synchronous status.

S24: During the synchronization, the operation core and the slave core execute their respective synchronous operations.

The operation core executes the replacement of the shared memory skip instruction, saves the function information in the core private memory, and then waits for the end of the slave core operation.

The slave core closes interruption and endless loop, and waits for the end of the operation of the operation core, then invalidates an instruction Cache and a data Cache that correspond to a share memory, executes the replacement of the skip instruction of a core private memory, and moves private data to this core.

S25: The synchronization ends, the operation core and the slave core execute respective services.

S26: Process the abnormal synchronization.

If the slave core is abnormal in the stage of the patching operation, and not involved in the synchronous operation, the synchronous mask flag thereof is removed from the synchronous mask table before the abnormal core is reset, and the backup area in the patch area is read to restore to the patch status after the abnormal core is reset, and the synchronous mask flag thereof is re-added to the synchronous mask table after the patch status is restored on the abnormal core successfully.

To sum up, in the multi-core online patching method provided by the embodiments of the present invention, by defining the private global variables as the structure variables, it can be ensured that the access performance of the private global variables in the patch is free from influence; by separating the shared global variables and the private global variables defined in the patch and adopting different variable types for different mapping manners, all the patch data can be mapped to the patch area of the shared memory, and the consistency of the cache maintained by software may be implemented and cache conflicts may be avoided. Furthermore, by backing up the function instruction of the core private memory and the core private data, the abnormal core can self-restore to the patch status according to the data backup area in the patch area after the abnormal core is reset; by processing the synchronous mask table when the patch is initialized, when the patch is activated, the operation core may initiate the synchronization event to the online slave core according to the latest synchronous mask table, and can implement that the patching operation can still be executed when the certain core with the same image is abnormal.

Therefore, the embodiments of the present invention solve multi-core patching problems of scenes such as hardware does not support address mapping, hardware does not maintain the consistency of the cache, and an application program needs to use the private global variables and the shared global variables at the same time. Besides, the embodiments of the present invention further implement that when a certain core is abnormal, there is no need to reset all the cores to perform the patching operation, and further implement the function of patch status self-restoring after the certain core is reset.

It should be understood that, the embodiment of the present invention is not only applicable to the multi-core DSP system of telecom-grade software, but also applicable to all multi-core processors without the MMU mapping function.

Figure 8:
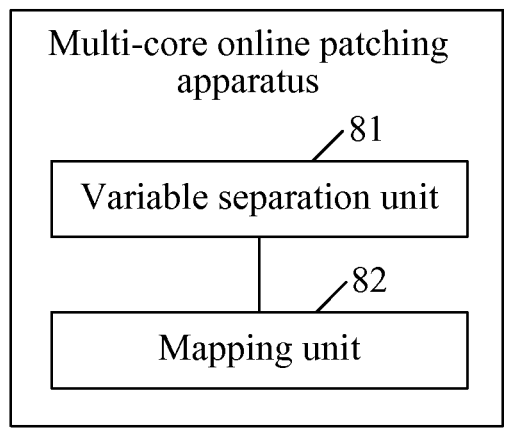
FIG. 8 is a schematic diagram of function units of an embodiment of a multi-core online patching apparatus provided by the present invention.

Corresponding to the embodiments of the multi-core online patch method of the present invention, referring to FIG. 8, the present invention further provides an embodiment of a multi-core online patch apparatus, including: a variable separation unit 81 configured to separate shared global variables and private global variables defined in a patch; and a mapping unit 82 configured to map the shared global variables to a shared data segment in a patch area by using a mapping mode of a direct memory address, and map the private global variables to private data segments in the patch area by using a mapping mode of a variable address specified by a user.

The variable separation unit 81 includes: a structure defining module configured to define the private global variables in the patch as structure variables, where a size of a structure is a size of a private data segment that is of each core and in the patch area; a magic number segmentation module configured to, after completing defining member variables of the structure variables, segment the remaining space by using a magic number, where data before the magic number is valid data; and a placing module configured to, when a patch file is written, place the shared global variables and the private global variables in the patch in different data segments.

The variable separation unit 81 separates the shared global variables and the private global variables defined in the patch, and the mapping unit 82 maps the shared global variables to the shared data segment in the patch area by using a mapping mode of a direct memory address and maps the private global variables to the private data segments in the patch area by using a mapping mode of a variable address specified by a user, thereby mapping all patch data to the patch area of a shared memory. Because different mapping manners are adopted for different variable types, the consistency of the cache maintained by software is also implemented, and cache conflicts are avoided.

Figure 9:
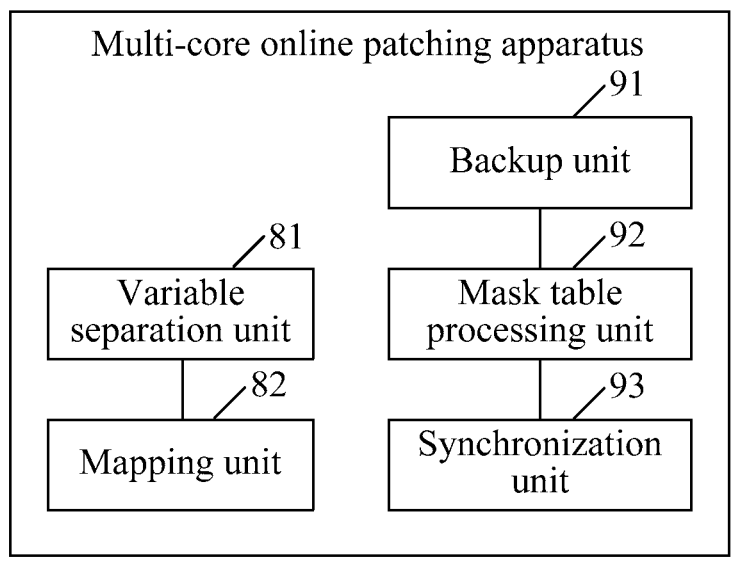
FIG. 9 is a schematic diagram of other function units of an embodiment of a multi-core online patching apparatus provided by the present invention.

Furthermore, referring to FIG. 9, the multi-core online patching apparatus of the embodiment of the present invention may further include: a backup unit 91 configured to back up a function instruction of a core private memory and core private data to a data backup area in the patch area.

Therefore, when a patch management end performs patch loading operation, for the core private data, apart from being loaded to the private data segments of each core of the corresponding patch area, the backup unit 91 further backs up the function instruction of the core private memory and the core private data to the data backup area in the patch area, and thereby the private data can also be restored when the patch status is restored.

Furthermore, still referring to FIG. 9, the multi-core online patching apparatus of the embodiment of the present invention may further include: a mask table processing unit 92 configured to, when the patch is initialized, configure a synchronous mask table with a same image for all cores, when a certain core in the multiple cores is abnormal, if the abnormal core exists in the synchronous mask table, remove a synchronous mask flag of the abnormal core from the synchronous mask table, after the abnormal core is reset, restore the abnormal core to a patch status according to the data backup area in the patch area, and re-add the removed synchronous mask flag to the synchronous mask table after the patch status is restored on the abnormal core successfully; and a synchronization unit 93 configured to, when the patch is activated, initiate, by an operation core, a synchronization event to an online slave core according to the latest synchronous mask table.

Therefore, after the mask table processing unit 92 processes the synchronous mask table when the patch is initialized, the synchronization unit 93 enables the operation core to initiate the synchronization event to the online slave core according to the latest synchronous mask table when the patch is activated, and that a certain core with the same image still can execute the patching operation can be implemented when the certain core is abnormal.

Persons of ordinary skill in the art should understand that functional units in the embodiments of the present invention may be integrated into a processing module, or each of the units may exist alone physically, or two or more units are integrated into a module. The integrated modules may be implemented in a form of hardware or may be implemented in a form of software functional modules. When being implemented in the form of software functional modules and sold or used as an independent product, the integrated modules may also be stored in a computer readable storage medium. The storage medium may be a magnetic disk, an optical disk, a read-only memory (ROM), or a random access memory (RAM), and the like.

The foregoing embodiments are not intended to limit the present invention. For persons of ordinary skill in the art, any modification, equivalent replacement, and improvement made without departing from the principle of the present invention shall fall within the protection scope of the present invention.

What is claimed is:

1. A multi-core online patching method comprising:
receiving a patch at a processor, wherein the processor comprises multiple cores and wherein the processor is coupled to a memory;
separating shared global variables and private global variables defined in the patch;
mapping the shared global variables to a shared data segment in a patch area by using a mapping mode of a memory address, wherein the shared global variables are obtained directly from the memory using the memory address; and
mapping the private global variables to private data segments in the patch area by using a mapping mode of a cache bus access address,
wherein the patch area comprises a shared area, a private area, and a backup area,
wherein the shared area comprises the shared data segment,
wherein the private area comprises the private data segments,
wherein the backup area comprises the private data segments, wherein the private data segments in the backup area restore the private data segments to one of the multiple cores after the one of the multiple cores is reset,
wherein the private data segments comprise multiple different segments,
wherein each one of the multiple different segments of the private data segments corresponds to one of the multiple cores of the processor,
wherein each one of the private global variables corresponds to one of the multiple cores of the processor, and
wherein the private global variables are mapped to the private data segments according to the multiple cores of the processor.

2. The method according to claim 1, wherein separating the shared global variables and the private global variables defined in the patch comprises:
defining the private global variables in the patch as structure variables, wherein a size of a structure is a size of a private data segment of each core that is in the patch area;
segmenting remaining space by using a segmentation number after defining member variables of the structure variables is completed, where data before the segmentation number is valid data; and
placing the shared global variables and the private global variables in the patch into different data segments when a patch file is written.

3. The method according to claim 2, wherein mapping the private global variables to the private data segments in the patch area by using the mapping mode of the variable address specified by the user comprises:
extracting valid data of the private global variables; and
mapping, according to the size of the defined structure, the valid data to the private data segment of each core that is in the patch area by using a mapping mode of the memory address or by using a mapping mode of the cache bus access address mapping.

4. The method according to claim 1, further comprising backing up a function instruction of a core private memory and core private data to the data backup area in the patch area.

5. The method according to claim 4, further comprising:
configuring a synchronous mask table with a same image for all cores when the patch is initialized;
removing a synchronous mask flag of an abnormal core from the synchronous mask table when a certain core in the multiple cores is abnormal and when the abnormal core is in the synchronous mask table;
restoring the abnormal core to a patch status according to the data backup area in the patch area after the abnormal core is reset;
re-adding the removed synchronous mask flag to the synchronous mask table after the patch status is restored on the abnormal core successfully; and
sending, by an operation core, a synchronization event to an online slave core according to the latest synchronous mask table when the patch is activated.

6. The method according to claim 1, wherein the multiple cores comprise a first core, a second core, and a third core, wherein the private data segments comprise a first core private data segment, a second core private data segment, and a third core private data segment, wherein a portion of the private global variables that corresponds to the first core is stored to the first core private data segment, wherein a portion of the private global variables that corresponds to the second core is stored to the second core private data segment, and wherein a portion of the private global variables that corresponds to the third core is stored to the third core private data segment.

7. A multi-core online patching apparatus comprising:
a memory; and
a processor coupled to the memory and configured to:
receive a patch, wherein the processor comprises multiple cores;
separate shared global variables and private global variables defined in the patch; and
map the shared global variables to a shared data segment in a patch area by using a mapping mode of a memory address, wherein the shared global variables are obtained directly from the memory using the memory address, and
map the private global variables to private data segments in the patch area by using a mapping mode of a cache bus access address,
wherein the patch area comprises a shared area, a private area, and a backup area,
wherein the shared area comprises the shared data segment,
wherein the private area comprises the private data segments,
wherein, the backup area comprises the private data segments, wherein the private data segments in the backup area restore the private data segments to one of the multiple cores after the one of the multiple cores is reset,
wherein the private data segments comprise multiple different segments,
wherein each one of the multiple different segments of the private data segments corresponds to one of the multiple cores of the processor,
wherein each one of the private global variables corresponds to one of the multiple cores of the processor, and
wherein the private global variables are mapped to the private data segments according to the multiple cores of the processor.

8. The apparatus according to claim 7, wherein the processor is further configured to:
define the private global variables in the patch as structure variables, wherein a size of a structure is a size of a private data segment of each core that is in the patch area;
after completing defining member variables of the structure variables, segment the remaining space by using a segmentation number, wherein data before the segmentation number is valid data; and
when a patch file is written, place the shared global variables and the private global variables in the patch in different data segments.

9. The apparatus according to claim 7, wherein the processor is further configured to back up a function instruction of a core private memory and core private data to the data backup area in the patch area.

10. The apparatus according to claim 9, wherein the processor is further configured to:
configure a synchronous mask table with a same image for all cores when the patch is initialized;
remove a synchronous mask flag of an abnormal core from the synchronous mask table when a certain core in the multiple cores is abnormal and when the abnormal core is in the synchronous mask table;
restore the abnormal core to a patch status according to the data backup area in the patch area after the abnormal core is reset; and
re-add the removed synchronous mask flag to the synchronous mask table after the patch status is restored on the abnormal core successfully.

11. The apparatus according to claim 10, wherein the processor is further configured to, when the patch is activated, initiate, by an operation core, a synchronization event to an online slave core according to the latest synchronous mask table processed by the mask table processing unit.

12. The apparatus according to claim 7, wherein the multiple cores comprise a first core, a second core, and a third core, wherein the private data segments comprise a first core private data segment, a second core private data segment, and a third core private data segment, wherein a portion of the private global variables that corresponds to the first core is stored to the first core private data segment, wherein a portion of the private global variables that corresponds to the second core is stored to the second core private data segment, and wherein a portion of the private global variables that corresponds to the third core is stored to the third core private data segment.

13. A non-transitory computer-readable medium having computer executable instructions for performing a method comprising:
receiving a patch at a processor, wherein the processor comprises multiple cores, and wherein the processor is coupled to a memory;
separating shared global variables and private global variables defined in the patch;
mapping the shared global variables to a shared data segment in a patch area by using a mapping mode of a memory address, wherein the shared global variables are obtained directly from the memory using the memory address; and
mapping the private global variables to private data segments in the patch area by using a mapping mode of a cache bus access address, wherein the patch area comprises a shared area, a private a, and a backup area, wherein the shared area comprises the shared data segment, wherein the private area comprises the private data segments, wherein the backup area comprises the private data segments, wherein the private data segments in the backup area restore the private data segments to one of the multiple cores after the one of the multiple cores is reset, wherein the private data segments comprise multiple different segments, wherein each one of the multiple different segments of the private data segments corresponds to one of the multiple cores of the processor, wherein each one of the private global variables corresponds to one of the multiple cores of the processor, and wherein the private global variables are mapped to the private data segments according to the multiple cores of the processor.

14. The method according to claim 6, wherein the patch area comprises a shared code segment, a shared data segment, the first core private data segment, the second core private data segment, the third core private data segment, and the backup area.

15. The apparatus according to claim 12, wherein the patch area comprises a shared code segment, a shared data segment, the first core private data segment, the second core private data segment, the third core private data segment, and the backup area.

16. The non-transitory computer-readable medium according to claim 13, wherein the multiple cores comprise a first core, a second core, and a third core, wherein the private data segments comprise a first core private data segment, a second core private data segment, and a third core private data segment, wherein a portion of the private global variables that corresponds to the first core is stored to the first core private data segment, wherein a portion of the private global variables that corresponds to the second core is stored to the second core private data segment, and wherein a portion of the private global variables that corresponds to the third core is stored to the third core private data segment.

17. The non-transitory computer-readable medium according to claim 16, wherein the patch area comprises a shared code segment, a shared data segment, the first core private data segment, the second core private data segment, the third core private data segment, and the backup area.

18. The non-transitory computer-readable medium according to claim 13, wherein the multiple cores comprise a first core, a second core, and a third core, wherein the private data segments comprise a first core private data segment, a second core private data segment, and a third core private data segment, wherein a portion of the private global variables that corresponds to the first core is stored to the first core private data segment, wherein a portion of the private global variables that corresponds to the second core is stored to the second core private data segment, and wherein a portion of the private global variables that corresponds to the third core is stored to the third core private data segment.

19. The non-transitory computer-readable medium according to claim 18, wherein the patch area comprises a shared code segment, a shared data segment, the first core private data segment, the second core private data segment, the third core private data segment, and the backup area.

20. The non-transitory computer-readable medium according to claim 13, wherein the computer executable instructions for performing the method further comprise backing up a function instruction of a core private memory and core private data to the data backup area in the patch area.

* * * * *